(12) United States Patent
Gregg et al.

(10) Patent No.: US 9,465,681 B2
(45) Date of Patent: Oct. 11, 2016

(54) COALESCING STAGES IN A MULTIPLE STAGE COMPLETION SEQUENCE

(71) Applicant: International Business Machines Corporation, Armonk, NY (US)

(72) Inventors: Thomas A. Gregg, Highland, NY (US); Kulwant M. Pandey, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/072,892

(22) Filed: Mar. 17, 2016

(65) Prior Publication Data

US 2016/0188389 A1    Jun. 30, 2016

Related U.S. Application Data

(63) Continuation of application No. 14/211,167, filed on Mar. 14, 2014.

(51) Int. Cl.
G06F 9/54    (2006.01)
G06F 13/24    (2006.01)
G06F 11/30    (2006.01)

(52) U.S. Cl.
CPC .......... *G06F 9/542* (2013.01); *G06F 11/3024* (2013.01); *G06F 11/3055* (2013.01)

(58) Field of Classification Search
CPC ..... G06F 9/542; G06F 11/3055; G06F 13/24
See application file for complete search history.

(56) References Cited

U.S. PATENT DOCUMENTS

| | | | | |
|---|---|---|---|---|
| 6,065,089 A * | 5/2000 | Hickerson | ............. | G06F 9/4825 710/266 |
| 6,574,694 B1 * | 6/2003 | Chen | ....................... | G06F 13/24 710/260 |
| 7,478,186 B1 * | 1/2009 | Onufryk | ................ | G06F 13/24 710/263 |
| 8,356,301 B2 | 1/2013 | Wu et al. | | |
| 2003/0200368 A1 * | 10/2003 | Musumeci | ............. | G06F 13/24 710/260 |
| 2008/0077724 A1 * | 3/2008 | Sarangam | ............... | G06F 13/26 710/264 |
| 2008/0147905 A1 * | 6/2008 | Shi | .......................... | G06F 13/32 710/22 |
| 2009/0022171 A1 * | 1/2009 | Chen | ..................... | H04L 47/193 370/412 |
| 2010/0274940 A1 * | 10/2010 | Ahmad | ................. | G06F 9/4812 710/267 |
| 2011/0093637 A1 * | 4/2011 | Gupta | .................. | G06F 9/4812 710/263 |
| 2011/0179413 A1 * | 7/2011 | Subramanian | ...... | G06F 9/45558 718/1 |
| 2012/0096206 A1 * | 4/2012 | Talamacki | .......... | G06F 9/45558 710/263 |
| 2013/0081064 A1 | 3/2013 | Huang et al. | | |
| 2013/0297832 A1 * | 11/2013 | Ahmad | ................... | G06F 13/24 710/5 |
| 2014/0359185 A1 * | 12/2014 | Sawal | ..................... | G06F 13/24 710/264 |
| 2015/0134867 A1 * | 5/2015 | Hildner | ................... | G06F 13/24 710/267 |
| 2015/0212564 A1 * | 7/2015 | Min | ........................ | G06F 13/24 713/320 |

* cited by examiner

*Primary Examiner* — Glenn A Auve
(74) *Attorney, Agent, or Firm* — Cantor Colburn LLP; Steven Chiu (57) ABSTRACT

Embodiments are directed to systems and methodologies for allowing a computer program code to efficiently respond to and process events. For events having a multiple stage completion sequence, and wherein several of the events occur within relatively close time proximity to each other, portions of the multiple stages may be coalesced without adding latency, thereby maintaining responsiveness of the computer program. The disclosed coalescing systems and methodologies include state machines and counters that in effect "replace" certain stages of the event sequence when the frequency of events increases.

1 Claim, 4 Drawing Sheets

COALESCING STAGES IN A MULTIPLE STAGE COMPLETION SEQUENCE

DOMESTIC PRIORITY

The present application claims priority to U.S. Non-provisional application 14/211,167 filed on Mar. 14, 2014 titled "COALESCING STAGES IN A MULTIPLE STAGE COMPLETION SEQUENCE," assigned to the assignee hereof and expressly incorporated by reference herein.

BACKGROUND

The present disclosure relates generally to computer system resources, and more specifically to managing event processing by a computer system.

In computer systems, the term "event" is used to describe an action that requires a response from some aspect of the computer system program code. For example, a user may strike a particular key (e.g., the ESC key) on the computer's keyboard, which could cause a target program code of the computer system to perform one or more actions associated with that key. Often the action that needs to be taken is described by so-called event descriptions stored in a queue in system memory. Upon the occurrence of an event, the target program code must find the event description, which may lead to special purpose program code, and execute it. Typically this involves notifying the target program code that an event has happened, as well notifying it of the location of the queue slot(s) holding the event description.

Notifying the target computer program code of an event can be accomplished by sending an interrupt request to the target computer program code. Because contemporary computer systems include many queues, additional stages are often provided so the target computer program code can find the queue slot(s) it needs without having to check through thousands of queues. For example, event "A" occurs, which causes the loading of an event description into a sequence of queue slots "B". A bit "C" is set in a bit vector to identify queue slot(s) B. A summary bit "D" is set to identify the aforementioned bit B. Finally, an interrupt signal alerts the target program code of the event. Upon receipt of the interrupt signal, the target program code finds the event description by moving through the aforementioned stages in the opposite direction. Thus, the interrupt signal points the target program code to summary bit D, which points to vector bit C, which points to queue slot(s) B, which contains the event description that directs the target computer program code how to carry out actions responsive to event A.

BRIEF SUMMARY

Embodiments are directed to a computer system for notifying a computer program of events. The system includes a memory, a tracking circuit, and a processor communicatively coupled to the tracking circuit and the memory. Each event generates an event alert capable of notifying the computer program of each event. The computer system is configured to perform a method including determining, by the tracking circuit, that multiple events occurred in succession and within a predetermined time of each other. The method further includes, in response to the multiple events occurring, suppressing all but one of the event alerts associated with the multiple events.

Embodiments are directed to a computer implemented method for notifying a computer program of events, wherein each event generates an event alert capable of notifying the computer program of each event. The method includes determining, by the tracking circuit, that multiple events occurred in succession and within a predetermined time of each other. The method further includes, in response to the multiple events occurring, suppressing all but one of the event alerts associated with the multiple events.

Embodiments are directed to a computer program product for notifying a computer program of events, wherein each event generates an event alert capable of notifying the computer program of each event. The computer program product includes a computer readable storage medium having program instructions embodied therewith, the program instructions readable by a processing circuit to cause the processing circuit to perform a method. The method includes determining, by the tracking circuit, that the multiple events occurred in succession and within a predetermined time of each other. The method further includes, in response to the multiple events occurring, suppressing all but one of the event alerts associated with the multiple events.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

Under routine operating conditions, events should be spaced far enough apart in time to allow each event's multiple stage completion sequence to finish. However, under some operating conditions the frequency of events can increase enough to potentially impact the responsiveness of the computer program code to events. Under such operating conditions, it is important that the computer program remains responsive to all events without adding undue latency to response times.

The present disclosure and exemplary embodiments described herein provide methodologies and systems for allowing a computer program code to efficiently respond to and process events. More specifically, for events having a multiple stage completion sequence, and wherein several of the events occur within relatively close time proximity to each other, portions of the multiple stages may be coalesced without adding latency, thereby maintaining responsiveness of the computer program. The disclosed coalescing systems and methodologies include state machines and tracking circuitry that in effect "replace" certain stages of the event sequence when the frequency of events increases (i.e., when events arrive in succession within, for example, about 1 microsecond of each other). The tracking circuitry essentially tracks or counts events so may be implemented as one or more counters.

Each event under the disclosed examples includes four stages in its completion sequence. The stages in the disclosed examples include an event stage that loads the event in a queue in memory, two pointer stages that direct the computer program to the location of the queue that holds the event, and an interrupt stage that alerts the computer program that an event has occurred. In general, a queue is a virtual "stack" of work objects in memory that are waiting to be processed, usually in sequential order starting at the beginning or top of the stack. A contemporary computer system manages many different queues, and each new work item is usually added to a particular queue at the top slot of its stack. A process that handles queued work objects from the bottom of the stack first is known as a first-in first-out (FIFO) process. A process that handles queued work objects at the top of the stack first is known as a last-in first-out (LIFO) process.

Events that occur in relatively close time proximity to each other are typically stored in close virtual proximity to each other in the same queue, and the multiple event stages that alert the computer program to the existence and location of the first event are substantially the same as the multiple event stages needed to alert the computer program to the existence and location of the subsequent, closely timed events. Thus, under the present disclosure, location and alert information are coalesced by using the same location and alert information for the first event to alert the computer program about the location of subsequent, closely timed events.

Multiple stages may be coalesced by providing state machines and counters that in effect "replace" certain repetitive stages when event frequency increases. For the disclosed example of a four stage event sequence, communication between hardware components involves a series of requests and corresponding responses. Under the disclosed embodiments, at least two counters are provided, along with at least one state machine for each stage of the event sequence that is coalesced. The first counter, referred to herein as a request counter, counts requests. A second counter, referred to herein as a pending counter, keeps track of the number of outstanding requests. The request counter keeps track of the number of requests made for each stage of an event's completion sequence. As each request is made, the request counter is incremented. If the request counter reaches a threshold (e.g., six), further event entries, if present, are temporarily suspended until responses are received for the pending requests. Thus, initiative is passed to the next stage in the sequence. Alternatively, initiative may be passed to the next stage before waiting for the previous stage's pending count to go to zero. Under either alternative, when event requests are received within a relatively short amount of time, the requests counter prevents forward progress of the completion sequence. The pending counters keep track of the number of outstanding requests for each stage of the completion sequence. As each request is made, the pending counter is incremented, and as each response is received, the pending counter is decremented. When the pending counter reaches zero, initiative is passed to the next stage in the sequence.

An exemplary system that can make use of one or more embodiments of the present disclosure is described in a co-pending, commonly assigned U.S. patent application, entitled "REMOTELY CONTROLLED MESSAGE QUEUE," by Richard K. Errickson, Michael P. Lyons and Peter K. Szwed, Ser. No. 14/211,187, filed Mar. 14, 2014, and expressly incorporated by reference herein.

Figure 1:
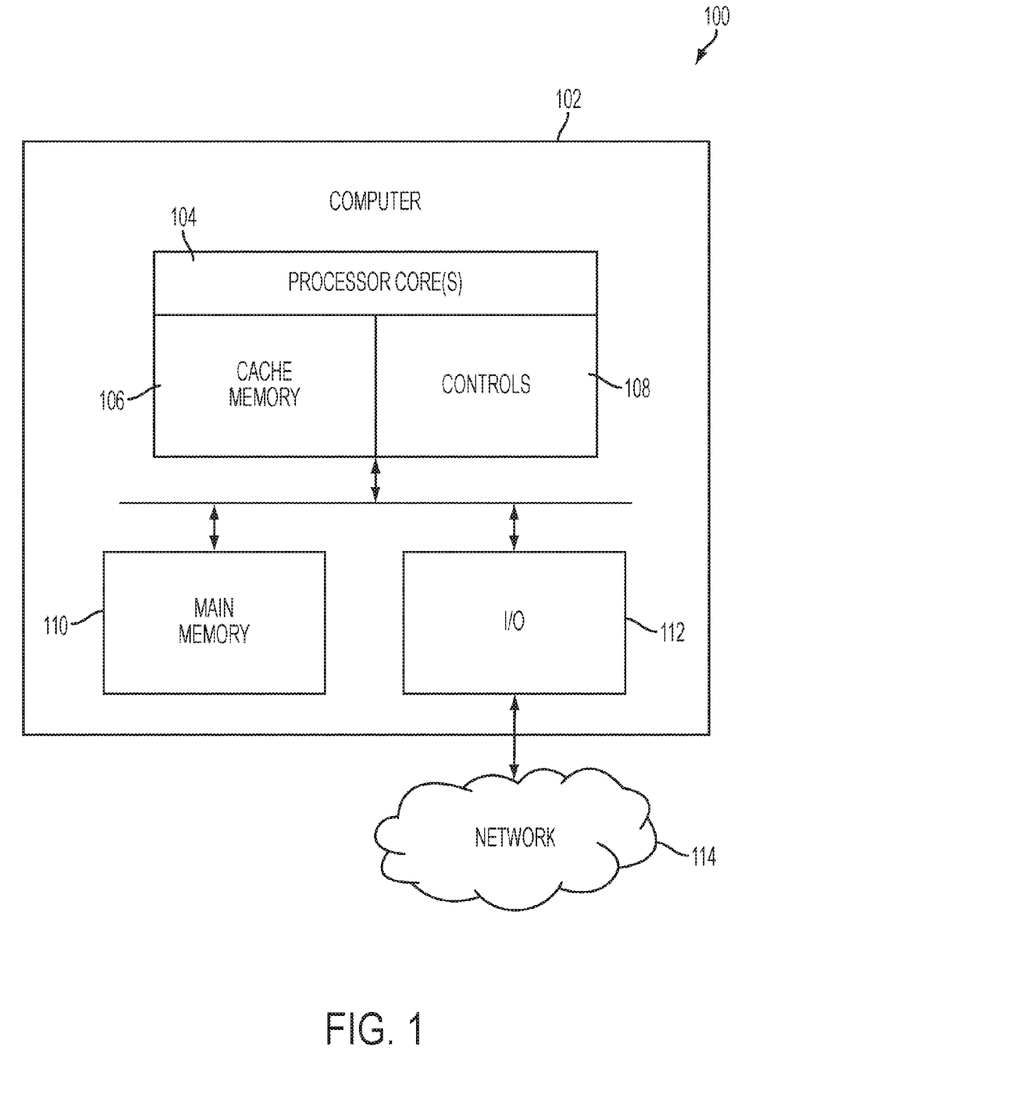
FIG. 1 depicts a block diagram illustrating an example of a computer system in accordance with one or more embodiments.

Turning now to the drawings in greater detail, wherein like reference numerals indicate like elements, FIG. 1 illustrates an example of a computer system 100 including an exemplary computing device ("computer") 102 configured for coalescing stages of a multiple stage sequence in accordance with the present disclosure. In addition to computer 102, exemplary computer system 100 includes network 114, which connects computer 102 to additional systems (not depicted) and may include one or more wide area networks (WANs) and/or local area networks (LANs) such as the Internet, intranet(s), and/or wireless communication network(s). Computer 102 and additional system are in communication via network 114, e.g., to communicate data between them.

Exemplary computer 102 includes processor cores 104, main memory ("memory") 110, and input/output component(s) 112, which are in communication via bus 103. Processor cores 104 includes cache memory ("cache") 106 and controls 108, which include components configured for pipeline sampling, which will be described in more detail below. Cache 106 may include multiple cache levels (not depicted) that are on or off-chip from processor 104. Memory 110 may include various data stored therein, e.g., instructions, software, routines, etc., which, e.g., may be transferred to/from cache 106 by controls 108 for execution by processor 104. Input/output component(s) 112 may include one or more components that facilitate local and/or remote input/output operations to/from computer 102, such as a display, keyboard, modem, network adapter, etc. (not depicted).

Figure 2:
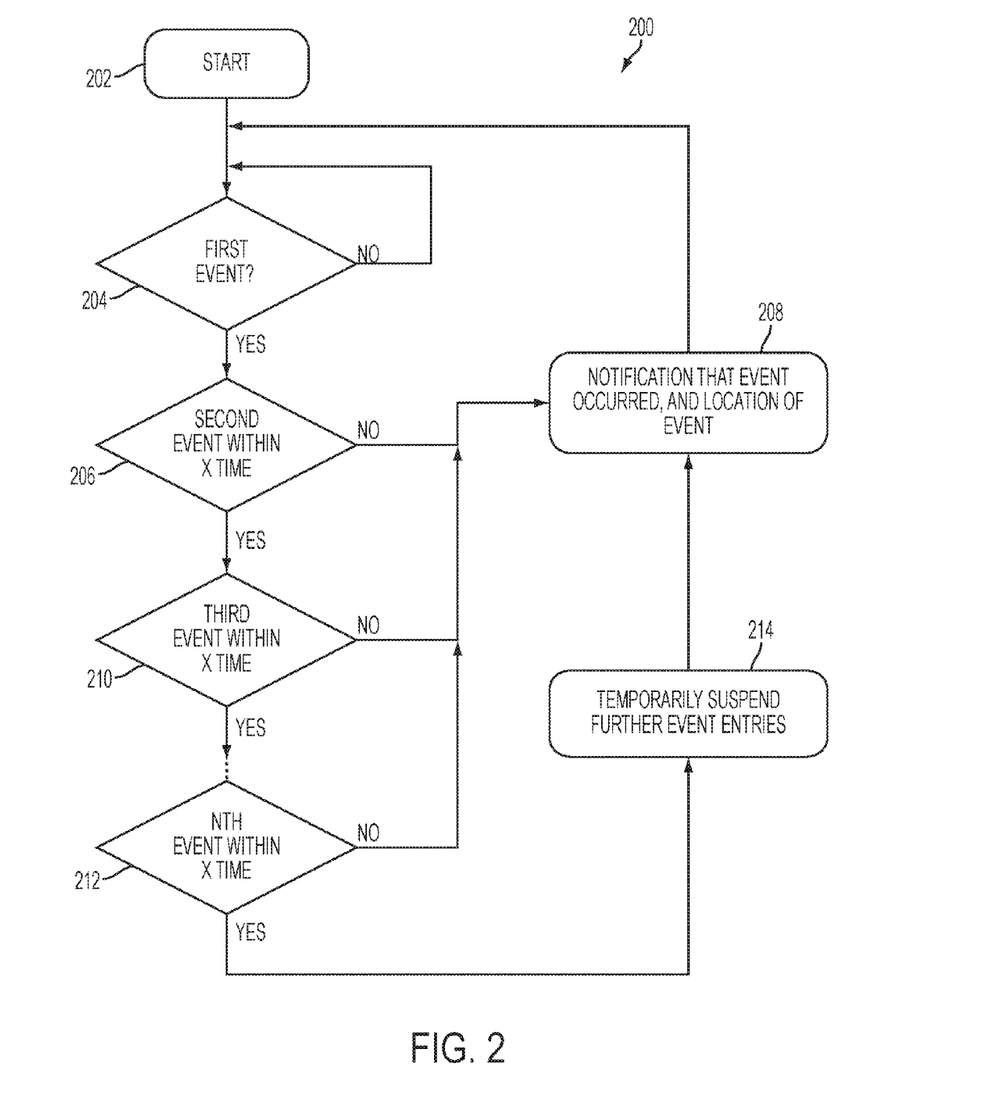
FIG. 2 depicts a flow diagram illustrating an example of a coalescing methodology in accordance with one or more embodiment.

FIG. 2 illustrates an event notification and execution methodology 200 of one or more embodiments of the present disclosure. The example described by methodology 200 includes events 1, 2, 3 . . . N. Although N in the illustrated example is at least 4, methodology 200 applies to any number of events from 1 to N. As depicted in FIG. 2, methodology 200 starts at block 202. Decision block 204 determines whether a first event has occurred. Determining that an event has occurred may be accomplished, for example, by sensing the subject event request and loading a description of the subject event in a queue of memory 110 (depicted in FIG. 1). If the result of the inquiry at decision block 204 is no, methodology 200 returns to an input of decision block 204 and continues looking for a first event. If the result of the inquiry at decision block 204 is yes, methodology 200 proceeds to decision block 206 to determine whether a second event has occurred within a predetermined time X of the first event. If the result of the inquiry at decision block 206 is no, only the first event has been received, and the first event was not followed within time X by a second event. Thus, methodology 200 proceeds to block 208 and alerts the computer program that an event has occurred, and the location of an event description representing the subject event in a queue in memory. Notifying the computer program that an event has occurred may be accomplished, for example, by an interrupt request. Notifying the computer program that an event has occurred may be accomplished, for example, by providing one or more pointers that point to the queue in memory 110 (depicted in FIG. 1) that holds a description of the subject event. Methodology 200 returns to an input of block 204 to look for a next first event.

If the result of the inquiry at decision block 206 is yes, at least a first event and a second event have occurred within time X of each other, and methodology 200 proceeds to decision block 210 to determine whether a third event has occurred within a time X of the second event. If the result of the inquiry at decision block 210 is no, only the first event and second event have occurred within time X of each other, and methodology 200 proceeds to block 208 and alerts the computer program that an event has occurred, along with the location of a description of the subject event in a queue in memory. Because the first and second events occur within a time X of each other, their respective event descriptions are stored in close proximity to one another in the same queue of memory 110 (shown in FIG. 1). Hence, the information needed to notify the computer program of the existence and location of the first event is substantially the same as the information needed to notify the computer program of the existence and location of the second event. Thus, block 208 coalesce the notification and location information by using the same notification and location information for the first event to notify the computer of and locate the second event.

If the result of the inquiry at decision block 210 is yes, at least first, second and third events have occurred within a time X of each other, and methodology 200 proceeds to decision block 212 to determine whether an Nth event has occurred within a time X of a preceding event. In effect, the continued succession of N events within a time X of each other delays presenting the notification and location information of block 208. The individual delays of X time (which may be, for example, 1 microsecond) are relatively small and well tolerated by the time constraints of contemporary computer systems. However, the aggregated X times from the succession of events could create more delay than desired if N becomes large. Thus, N and X are chosen such that any delay (i.e., N*X) in presenting block 208 of methodology 200 is tolerable by the overall computer program and does not result in undue latency between events and their corresponding responses from the target computer program.

If the result of the inquiry at decision block 212 is no, methodology 200 has not reached the N event limit, and proceeds to block 208 and alerts the computer program that an event has occurred, along with the location of a description of the subject event in a queue in memory. Because the N-1 events occur within a time X of each other, their respective event descriptions are stored in close proximity to one another in the same queue of memory 110 (shown in FIG. 1). Hence, the information needed to notify the computer program of the existence and location of the first event is substantially the same as the information needed to notify the computer program of the existence and location of the subsequent events. Thus, block 208 coalesce the notification and location information by using the same notification and location information for the first event to notify the computer of and locate subsequent events that follow within X time of each other.

If the result of the inquiry at decision block 212 is yes, the N event limit has been reached. In order to not lose events, methodology 200 at block 214 temporarily suspends further event entries. Any event entries after N are not lost, however because they may be held in temporary memory such as cache memory 106 until methodology 200 completes block 208 and returns to an input of block 204 to look for a next first event. Thus, in addition to the selection of X and N, the temporary suspension time introduced through block 214 should be chosen such that N*X and the execution of blocks 214 and 208 do not result in undue latency between events and their corresponding responses from the target computer program. From block 214, methodology proceeds to block 208 and alerts the computer program that an event has occurred, along with the location of descriptions of the subject event in a queue in memory. Because the N events occur within a time X of each other, their respective event descriptions are stored in close proximity to one another in the same queue of memory 110 (shown in FIG. 1). Hence, the information needed to notify the computer program of the existence and location of the first event is substantially the same as the information needed to notify the computer program of the existence and location of the subsequent events. Thus, block 208 coalesce the notification and location information by using the same notification and location information for the first event to notify the computer of and locate subsequent events that follow within X time of each other.

Figure 3:
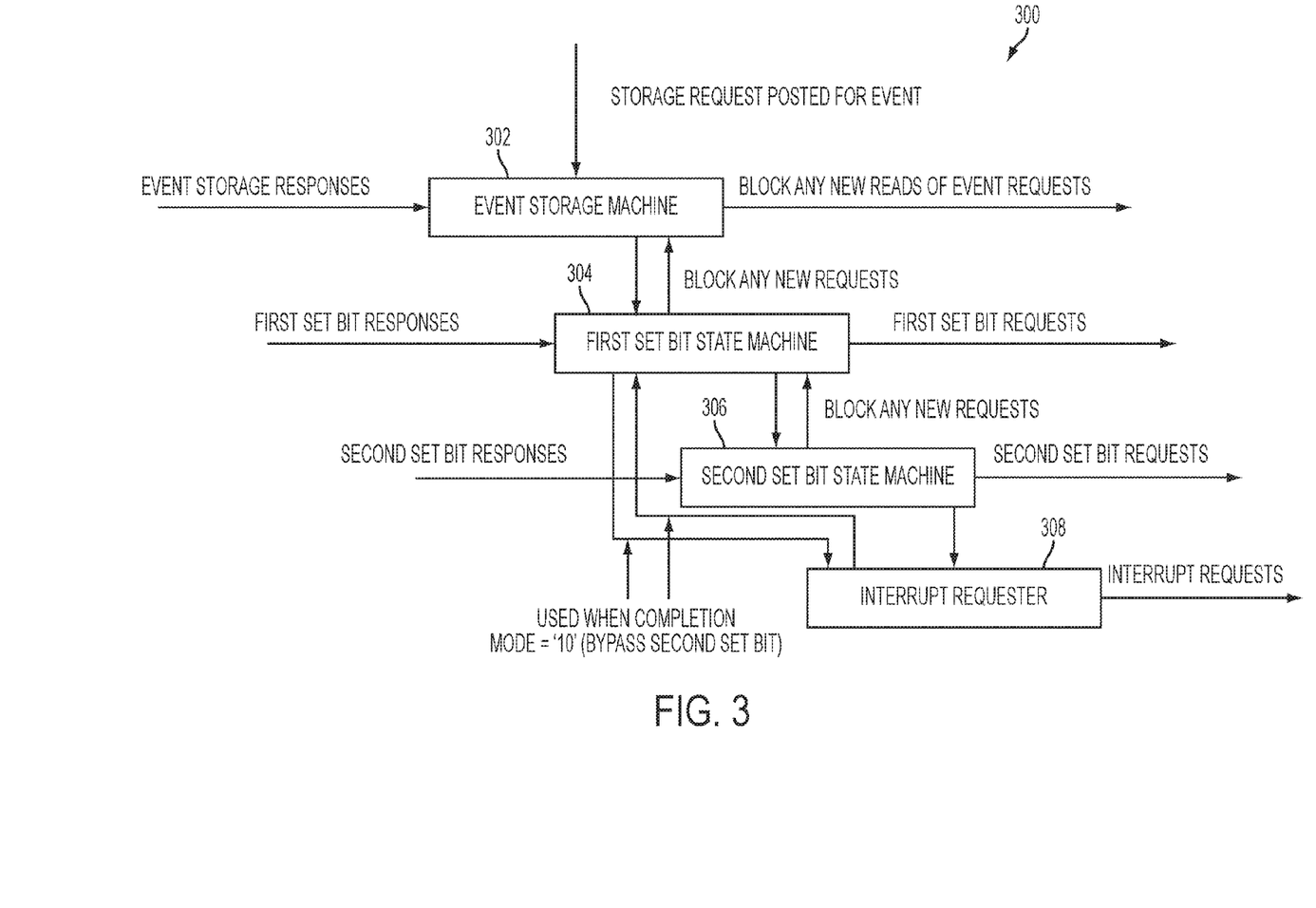
FIG. 3 depicts a block diagram illustrating an example of a coalescing system in accordance with one or more embodiments.

FIG. 3 depicts a block diagram illustrating an example of a coalescing system 300 in accordance with one or more embodiments of the present disclosure. Coalescing system 300 is shown for a particular configuration having multiple stages in which two intermediate pointers point the computer program to the queue that holds event descriptions needed to begin executing the subject event(s). However, it will be understood that the disclosed methodology is applicable to a variety multiple stage configurations.

Continuing with FIG. 3, coalescing system 300 includes an event storage machine 302, a first set bit state machine 304, a second set bit state machine 306 and an interrupt requester 308, configured and arranged as shown. Coalescing system 300 further includes a request counter (REQ COUNT, depicted in FIGS. 4 and 5) and a pending counter (PEND COUNT, depicted in FIGS. 4 and 5). REQ COUNT keeps track of the number of requests made for each stage of an event's completion sequence. As each request is made, the corresponding REQ COUNT is incremented. If REQ COUNT reaches a threshold (e.g., six), further event entries, if present, are temporarily suspended until responses are received for the pending requests. Thus, initiative is passed to the next stage (first set bit state machine 304) in the sequence. Alternatively, initiative may be passed to a subsequent stage (e.g., interrupt requester 308) before waiting for the previous stage's pending count to go to zero. Under this alternative, second set bit state machine 306 would be bypassed. This may be, for example, an alternative completion mode of the system, in this case represented by a binary "10". Under either alternative, for event requests received in relatively close time proximity to each other, REQ COUNT does not allow these closely timed event requests to prevent forward progress of the completion sequence. PEND COUNT keeps track of the number of outstanding requests for each stage of the completion sequence. As each request is made, PEND COUNT is incremented, and as each response is received, PEND COUNT is decremented. When PEND COUNT reaches zero, initiative is passed to the next stage in the sequence. Thus, REQ COUNT keeps track of how many storages have been issued (i.e., a total count), and PEND COUNT keeps track of on how many responses are pending or need responses from memory. If PEND COUNT goes to zero, first set bit state machine 304 is started, and the total count is set to zero. To prevent stalling and ensure forward progress, if the total count reaches a predetermined limit (e.g., 6 or more) a signal is generated that temporarily blocks event requests reads, and the next stage is started.

The next stage is first set bit state machine 304. REQ COUNT keeps track of how many "set bit" stores have been issued (i.e., a total count), and PEND COUNT keeps track of on how many responses are pending. If PEND COUNT goes to zero, second set bit state machine 306 is started. To prevent stalling and ensure forward progress, if the total count reaches a predetermined number (e.g., 6 or more), storage state machine 302 is asked to stop sending any more set bit commands to first set bit state machine 304.

The next stage is second set bit state machine 306. REQ COUNT keeps track of how many "set bit" stores have been issued (i.e., a total count), and PEND COUNT keeps track of how many responses are pending. If PEND COUNT goes to zero, interrupt requester 308 is started, and the total count is set to zero. To prevent stalling and ensure forward progress, if the total count reaches a predetermined number (e.g., 6 or more), first set bit state machine 304 is asked to stop sending any more set bit commands to second set bit state machine 306.

The next stage is interrupt requester 308, which issues its interrupt request using the parameters in its interrupt register (not depicted). Interrupt requester 308 does not wait for any responses. When events occur within relatively close time to one another, there are back to back event entries received. Depending on how closely the event entries are processed in real time, and how long the wait is for responses for stores and set bit stores, some or none of the set bit stores may be coalesced. In all cases, for the last event entry received, the subject completion sequence is performed.

Figure 4:
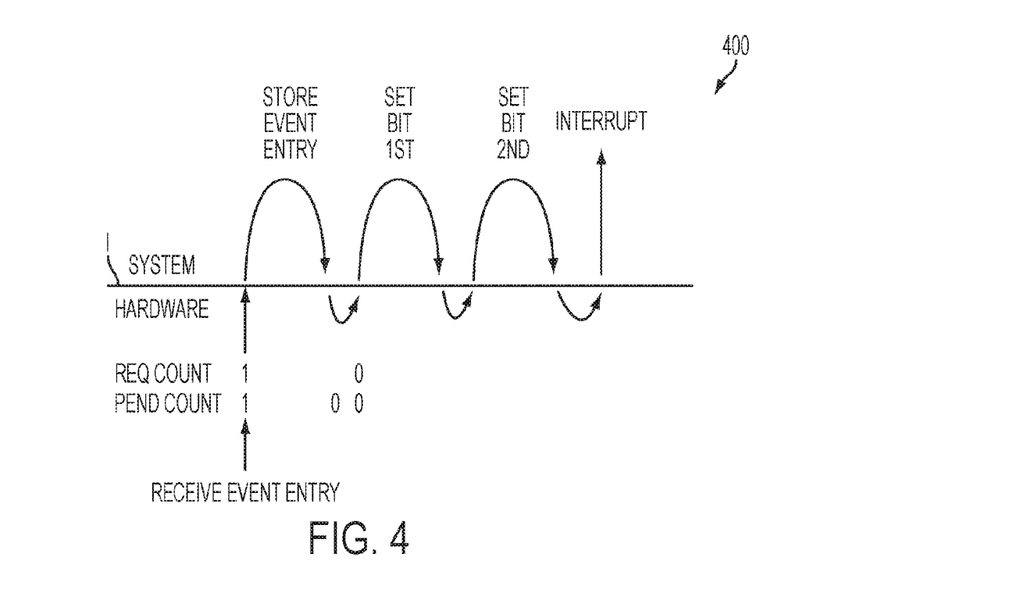
FIG. 4 depicts a diagram illustrating an example of a coalescing system in accordance with one or more embodiments.
Figure 5:
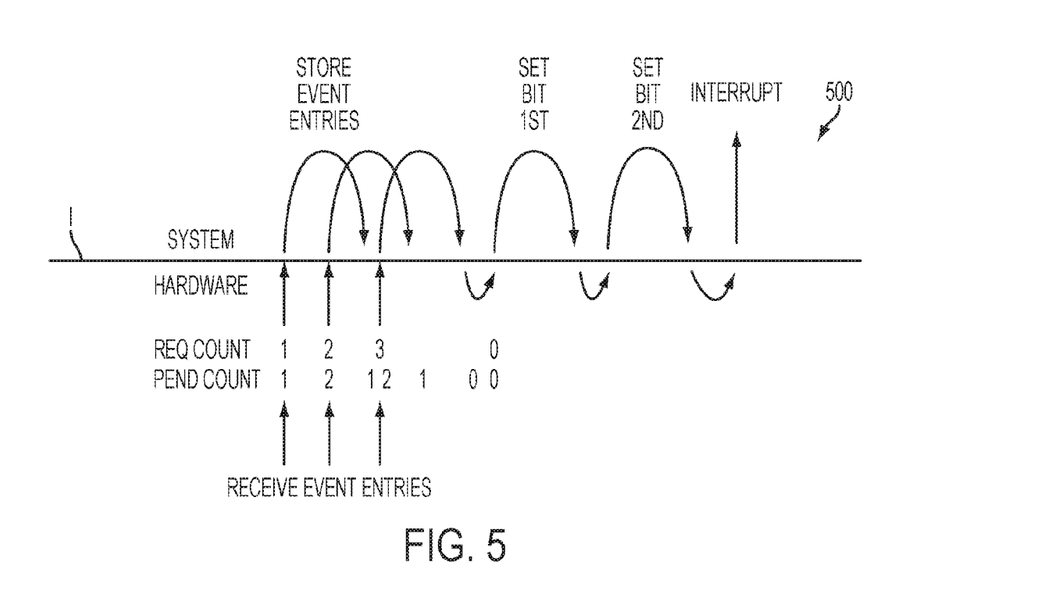
FIG. 5 depicts another diagram further illustrating an example of a coalescing system in accordance with one or more embodiments.

FIGS. 4 and 5 depict two diagrams 400, 500, respectively, illustrating an example of the coalescing system 300 shown in FIG. 3. FIG. 4 depicts the processing stages for a single event entry. The horizontal line (I) is the interface between the system hardware and the rest of the system. Horizontal line (I) corresponds to the horizontal bus line shown in FIG. 1 that communicatively connects I/O 112 with memory 106, 110 and processor cores 104. As shown in FIG. 4, when an event entry is received (RECEIVE EVENT ENTRY), the hardware stores the data (STORE EVENT ENTRY), waits for the response, stores the first set bit (STORE BIT 1st), waits for the response, stores the second set bit (STORE BIT 2nd), waits for the response, then sends an interrupt (INTERRUPT). When the event data is stored, REQ COUNT and PEND COUNT are incremented. When the event store response is received, PEND COUNT is decremented, which takes it to zero. The first set bit operations (SET BIT 1st), which is followed by the SET BIT 2nd and INTERRUPT operations, and REQ COUNT and PEND COUNT are reset to zero.

Diagram 500 of FIG. 5 depicts the processing of three events that arrive in rapid succession, moving horizontally on diagram 500 from left to right. When an event entry is received (RECEIVE EVENT ENTRIES), the hardware stores the data (STORE EVENT ENTRIES) and increments REQ COUNT and PEND COUNT to 1. A second event entry is received before the first event entry generates a response, and REQ COUNT and PEND COUNT are incremented to 2. The response for the first event store response is received, and PEND COUNT is decremented to 1. Because PEND COUNT is not zero, no further action is taken. A third event entry is received before the second event entry generates a response, and REQ COUNTER is incremented to 3 and PEND COUNT is incremented to 2. The response for the second event store response is received and PEND COUNT is decremented to 1. Because PEND COUNT is not zero, no further action is taken. The response for the third event store response is received and PEND COUNT is decremented to 0. Here, the pending counter reached zero, and the first set bit operations (SET BIT 1st), are started and both counters are reset to zero. The operation for subsequent two stages (SET BIT 2nd and INTERRUPT) proceeds in the same way as described above in connection with FIG. 4. It is noted that, if events continue to arrive in rapid succession, beyond the 3 rapid events shown in FIG. 5, the counters would reach their threshold, and receipt of further events would be temporarily delayed so that the subsequent stages could commence. This corresponds to blocks 212, 214 and 208 in methodology 200 shown in FIG. 2.

Technical effects and benefits include providing methodologies and systems for allowing a computer program code to efficiently respond to and process events. More specifically, for events having a multiple stage completion sequence, and wherein several of the events occur within relatively close time proximity to each other, portions of the multiple stages may be coalesced without adding latency, thereby maintaining responsiveness of the computer program. The disclosed coalescing systems and methodologies include state machines and tracking circuitry that in effect "replace" certain stages of the event sequence when the frequency of events increases (i.e., when events arrive in succession within, for example, about 1 micro-second of each other). The tracking circuitry essentially tracks or counts events so may be implemented as one or more counters.

Each event under the disclosed examples includes four stages in its completion sequence. The stages in the disclosed examples include an event stage that loads the event in a queue in memory, two pointer stages that direct the computer program to the location of the queue that holds the event, and an interrupt stage that alerts the computer program that an event has occurred. In general, a queue is a virtual "stack" of work objects in memory that are waiting to be processed, usually in sequential order starting at the beginning or top of the stack. A contemporary computer system manages many different queues, and each new work item is usually added to a particular queue at the top slot of its stack. A process that handles queued work objects from the bottom of the stack first is known as a first-in first-out (FIFO) process. A process that handles queued work objects at the top of the stack first is known as a last-in first-out (LIFO) process.

Events that occur in relatively close time proximity to each other are typically stored in close virtual proximity to each other in the same queue, and the multiple event stages that alert the computer program to the existence and location of the first event are substantially the same as the multiple event stages needed to alert the computer program to the existence and location of the subsequent, closely timed events. Thus, under the present disclosure, location and alert information are coalesced by using the same location and alert information for the first event to alert the computer program about the location of subsequent, closely timed events.

Multiple stages may be coalesced by providing state machines and counters that in effect "replace" certain repetitive stages when event frequency increases. For the disclosed example of a four stage event sequence, communication between hardware components involves a series of requests and corresponding responses. Under the disclosed embodiments, at least two counters are provided, along with at least one state machine for each stage of the event sequence that is coalesced. The first counter, referred to herein as a request counter, counts requests. A second counter, referred to herein as a pending counter, keeps track of the number of outstanding requests. The request counter keeps track of the number of requests made for each stage of an event's completion sequence. As each request is made, the request counter is incremented. If the request counter reaches a threshold (e.g., six), further event entries, if present, are temporarily suspended until responses are received for the pending requests. Thus, initiative is passed to the next stage in the sequence. Alternatively, initiative may be passed to the next stage before waiting for the previous stage's pending count to go to zero. Under either alternative, when event requests are received within a relatively short amount of time, the requests counter prevents forward progress of the completion sequence. The pending counters keep track of the number of outstanding requests for each stage of the completion sequence. As each request is made, the pending counter is incremented, and as each response is received, the pending counter is decremented. When the pending counter reaches zero, initiative is passed to the next stage in the sequence.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for notifying a computer program of events, the system comprising:
 a memory;
 a tracking circuit comprising at least one counter; and
 a processor communicatively coupled to the tracking circuit and the memory;
 wherein the computer system is configured to perform a method comprising:
  determining, by the tracking circuit, that events have occurred, wherein a total number of the events comprises a range from 1 to N, wherein N comprises a predetermined number;
  determining, by the tracking circuit, that 1 to N events occurred in succession and within a predetermined time of each other;
  in response to determining, by the tracking circuit, that 1 to N events occurred in succession and within a predetermined time of each other, delaying transmitting an event notification and location alert for any one of the 1 to N events to the computer program until after the N event occurs;
  in response to determining, by the tracking circuit, that the N event occurred, temporarily suspending receipt of subsequent events and transmitting to the computer program an event notification and location alert of at least one of the 1 to N events;
 wherein the event notification and location alert of the at least one of the 1 to N events provides a notification to the computer program comprising at least the following:
  that the at least one of the 1 to N events occurred: and
  information about a location of the at least one of the 1 to N events;
 wherein the alert comprises:
  setting an interrupt request; and
  setting at least one pointer;
 wherein setting the at least one pointer comprises setting at least one summary bit that points to a bit vector;
 wherein the bit vector points to a location in the memory that holds an event description representing the at least one of the 1 to N events;
 wherein the computer program uses the event notification and location alert of the at least one of the 1 to N events to provide event notification and location alerts for all of the 1 to N events.

* * * * *